United States Patent
Nardelli et al.

(10) Patent No.: US 8,264,331 B2
(45) Date of Patent: Sep. 11, 2012

(54) METHOD AND APPARATUS FOR DETECTING CONTAINER MOVEMENT BY A CRANE

(75) Inventors: Albert Nardelli, Mountain View, CA (US); Stephen E. Hilliker, San Jose, CA (US); Timothy K. Brand, Cupertino, CA (US); Joseph S. Chan, Los Gatos, CA (US); Nikola Cargonja, San Carlos, CA (US)

(73) Assignee: Savi Technology, Inc., Mountain View, CA (US)

( * ) Notice: Subject to any disclaimer, the term of this patent is extended or adjusted under 35 U.S.C. 154(b) by 1143 days.

(21) Appl. No.: 11/732,127

(22) Filed: Apr. 2, 2007

(65) Prior Publication Data
US 2008/0036603 A1      Feb. 14, 2008

Related U.S. Application Data

(60) Provisional application No. 60/837,467, filed on Aug. 14, 2006.

(51) Int. Cl.
*H04Q 5/22* (2006.01)
(52) U.S. Cl. .................................... 340/10.3
(58) Field of Classification Search ............. 340/10.3, 340/825.69, 505, 539.1, 10.4, 10.5, 572.7
See application file for complete search history.

(56) References Cited

U.S. PATENT DOCUMENTS

| | | | | |
|---|---|---|---|---|
| 3,876,980 A | * | 4/1975 | Haemmig et al. | 714/822 |
| 4,030,088 A | * | 6/1977 | McCullough | 340/903 |
| 4,054,881 A | * | 10/1977 | Raab | 342/448 |
| 4,112,421 A | * | 9/1978 | Freeny, Jr. | 342/457 |
| 5,977,913 A | * | 11/1999 | Christ | 342/465 |
| 6,384,712 B1 | * | 5/2002 | Goldman et al. | 340/10.3 |
| 6,669,089 B2 | * | 12/2003 | Cybulski et al. | 235/385 |
| 7,340,373 B2 | * | 3/2008 | Shimomura | 702/173 |
| 7,471,203 B2 | * | 12/2008 | Worthy et al. | 340/572.1 |
| 7,525,434 B2 | * | 4/2009 | Batra | 340/572.1 |

* cited by examiner

*Primary Examiner* — Vernal Brown
(74) *Attorney, Agent, or Firm* — Haynes and Boone, LLP

(57) ABSTRACT

A tag can receive first and second wireless signals respectively defining first and second transmission fields that overlap. When the tag moves from the first field to the second field through the region of overlap, the apparatus transitions only once from recognizing the tag is in the first field to recognizing the tag is in the second field. According to another aspect, first and second signposts are supported at spaced locations in the region of a crane, and respectively transmit first and second wireless signals that are different, and that respectively define first and second fields of transmission. According to yet another aspect, a signpost transmits wireless signals having a transmission field, and a system senses positional information regarding a tag movable relative to the signpost, the system using the positional information to determine a location of the tag in relation to the transmission field.

31 Claims, 8 Drawing Sheets

METHOD AND APPARATUS FOR DETECTING CONTAINER MOVEMENT BY A CRANE

This application claims the priority under 35 U.S.C. §119 of provisional application No. 60/837,467 filed Aug. 14, 2006.

FIELD OF THE INVENTION

This invention relates in general to techniques for tracking containers or other objects and, more particularly, to tracking techniques that use radio frequency identification technology.

BACKGROUND

It is desirable to be able to track containers or other objects, for example during shipment of a container. One known technique for tracking a container is to mount a radio frequency identification (RFID) tag on the container. The RFID tag can transmit wireless signals, and typically can also receive wireless signals.

In more detail, there are RFID tags capable of receiving wireless signals transmitted by a signpost, where these wireless signals contain a digital code that uniquely identifies a particular signpost. These tags then transmit tag signals that contain a unique code identifying the tag as well as the unique code identifying the signpost. In circumstances where the transmission ranges or fields of two signposts effectively overlap, a tag moving through the overlap region is likely to receive signpost signals from each of the two tags in an alternating manner. It can be problematic if the tag repeatedly "flip-flops" back and forth between recognizing one signpost and recognizing the other signpost. A suitable technique to avoid this is desirable.

A different consideration is that, in order to successively load or unload a plurality of containers to or from a location such as the cargo hold of a ship, a large crane is typically used. It would be advantageous to have a technique for tracking containers while they are being moved by such a crane.

BRIEF DESCRIPTION OF THE DRAWINGS

A better understanding of the present invention will be realized from the detailed description that follows, taken in conjunction with the accompanying drawings, in which.

DETAILED DESCRIPTION

Figure 1:
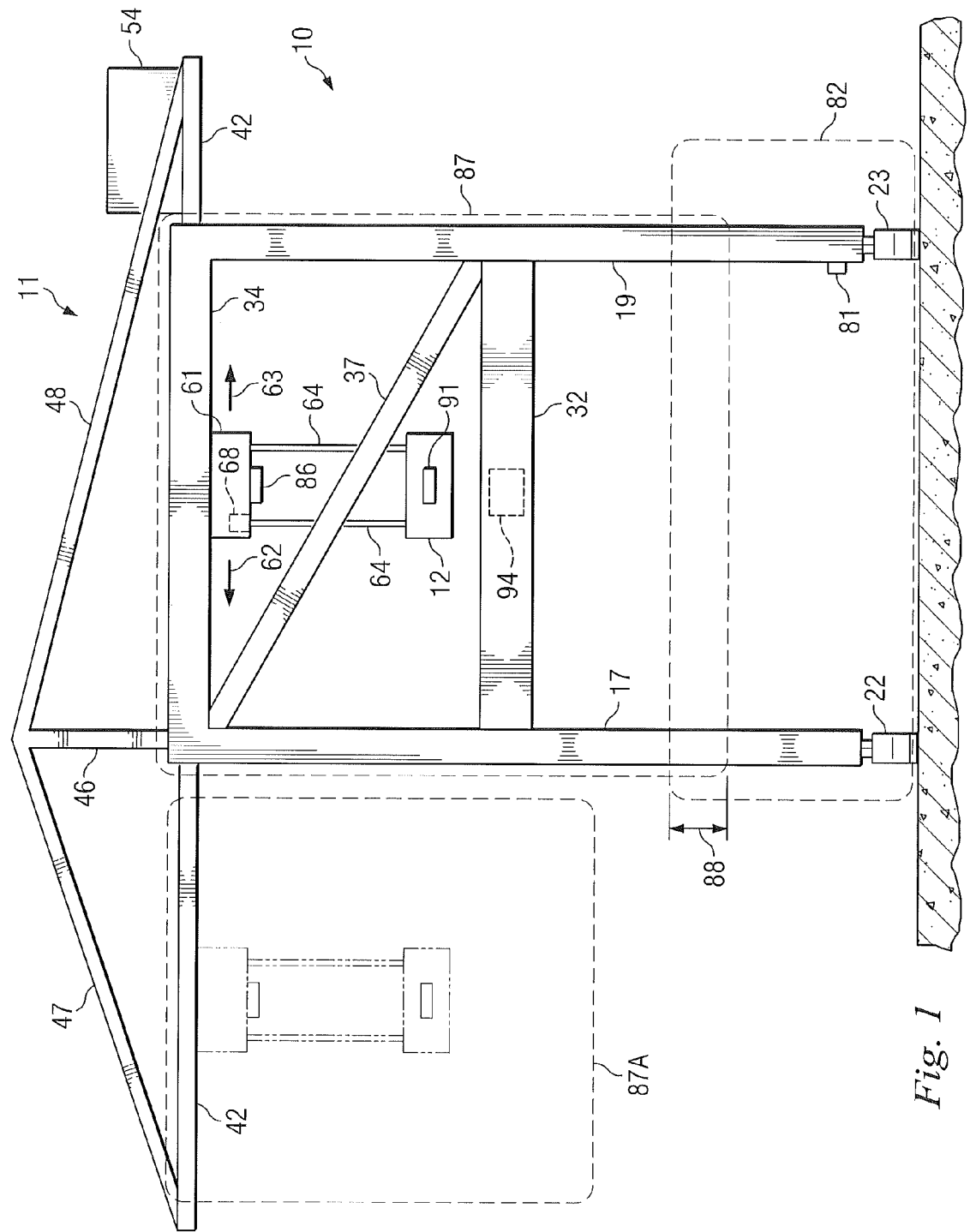
FIG. 1 is a diagrammatic side view of an apparatus that embodies aspects of the invention, and that includes a large crane, and a container supported by the crane.
Figure 2:
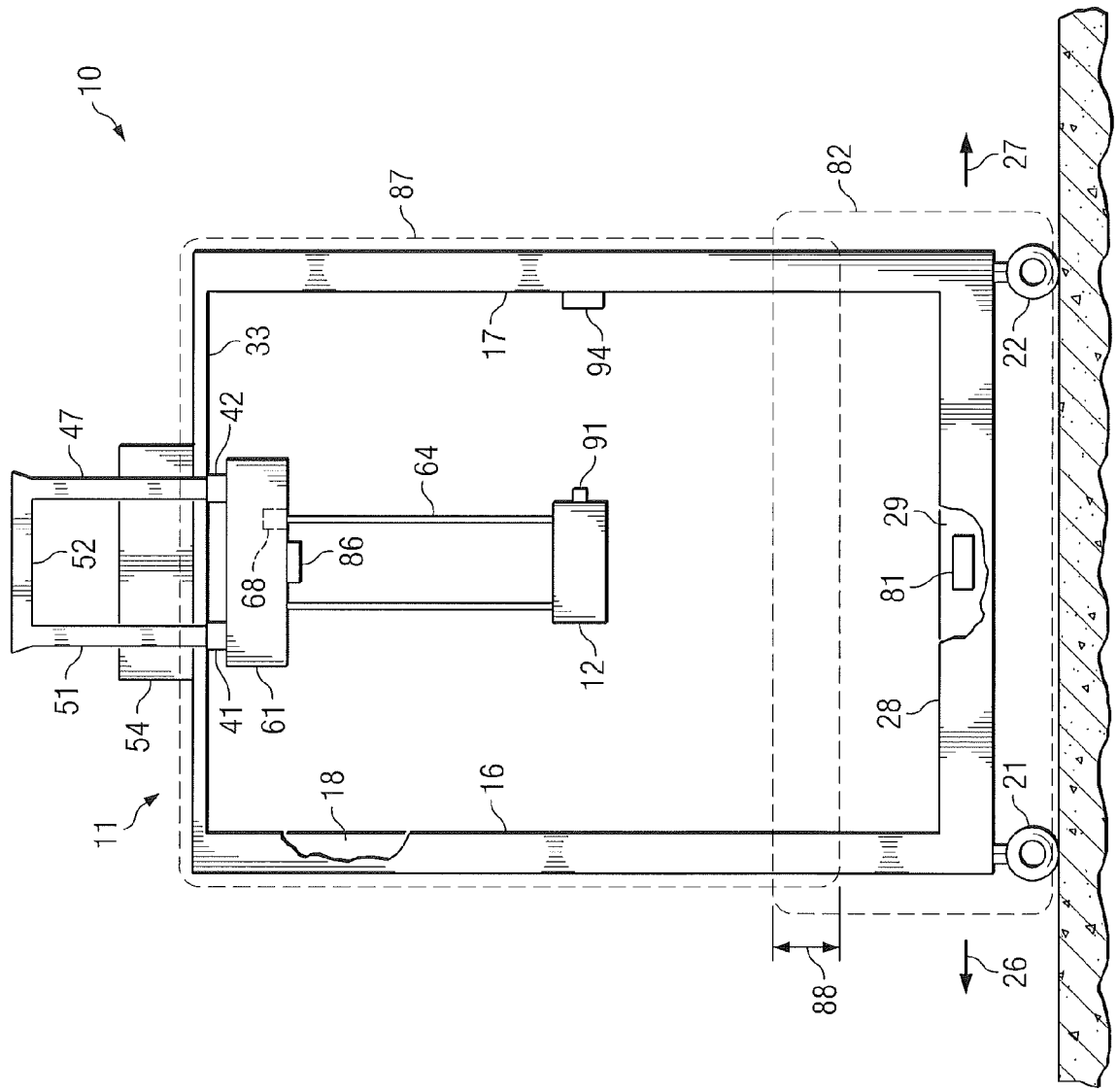
FIG. 2 is a diagrammatic front view of the crane and container of FIG. 1.

FIG. 1 is a diagrammatic side view of an apparatus 10 that includes a large crane 11, and a container 12 supported by the crane. FIG. 2 is a diagrammatic front view of the crane and container of FIG. 1. In the disclosed embodiment, the container 12 is a conventional shipping container of a well-known type. For example, the container may conform to standards set by the International Organization for Standardization (ISO), and in particular may be a container that complies with an industry-standard specification known as an ISO 668:1995(E) Series 1 freight container. The vast majority of containers that are currently in commercial use conform to this ISO standard.

The crane 11 is used for moving large objects, such as the shipping container 12. As one particular example, the crane may be used to successively load or unload a plurality of containers to or from a location such as the cargo hold of a ship. The crane 11 includes an approximately rectangular frame that is made of steel, and that has vertical edges defined by four parallel, vertical posts 16-19. The frame of the crane could alternatively be made of some other suitable material, such as aluminum. A respective wheel is rotatably supported at the lower end of each of the posts 16-19, three of these wheels being visible at 21-23 in the drawings. The wheels facilitate transverse movement of the entire crane 11 in directions 26 and 27 (FIG. 2).

As shown in FIG. 2, the frame of the crane includes a horizontal lower beam 28 that extends between and is fixedly secured to the lower ends of the posts 16 and 17. A similar horizontal lower beam 29 extends between and is secured to the lower ends of the posts 18 and 19. With reference to FIG. 1, a middle beam 32 extends horizontally between and is secured to the posts 17 and 19, at a location approximately halfway along the length of each post. A similar middle beam extends horizontally between and is secured to the posts 16 and 18, but is not visible in the drawings. With reference to FIG. 2, an upper beam 33 extends horizontally between and is secured to the upper ends of the posts 16 and 17. A similar upper beam extends horizontally between and is secured to the upper ends of the posts 18 and 19, but is not visible in drawings. Yet another upper beam 34 extends horizontally between and is secured to the upper ends of the posts 17 and 19. And a further upper beam extends horizontally between and is secured to the upper ends of the posts 16 and 18, but is not visible in the drawings. With reference to FIG. 1, a diagonal beam 37 has one end fixedly secured to the intersection of post 17 and beam 34, and has its other end fixedly secured to the intersection of post 19 and beam 32. A similar diagonal beam is provided on the opposite side of the crane, but is not visible in the drawings.

Two parallel, horizontal support beams 41 and 42 are fixedly supported beneath the upper beams 33 of the crane frame, and extend both forwardly and rearwardly beyond the frame of the crane. With reference to FIG. 1, a vertical post 46 and two diagonal struts 47 and 48 are provided over the support beam 42. The post 46 has its lower end secured to the upper beam 33. The diagonal struts 47 and 48 each have one end secured to the top of the post 46, and the other end secured to a respective end of the support beam 42. A similar vertical post with two struts is provided over the support beam 41, one of these diagonal struts being visible at 51 in FIG. 2. A horizontal cross-beam 52 extends between and is secured to the upper ends of the vertical posts. A counterweight 54 is fixedly supported on the upper side of the support beams 41 and 42, rearwardly of the frame of the crane.

The crane 11 includes a cabin 61 that is disposed just below the support beams 41 and 42. The cabin 61 is supported by the support beams 41 and 42 for horizontal movement therealong, as indicated diagrammatically by arrows 62 and 63 in FIG. 1. Inside the cabin 61 are not-illustrated controls that can be manually manipulated by a human operator, in order to control operation of the crane 11. Several cables 64 extend vertically downwardly from the cabin 61, and have their lower ends detachably coupled to the container 12. The cabin 61 includes a not-illustrated hoist arrangement that can effect vertical movement of the cables 64, in order to raise and lower the container 12. A cable position sensor is shown diagrammatically at 68, and produces an electrical signal that represents the vertical position of the cables 64, and thus the vertical position of the container 12. Although the sensor 68 in the disclosed embodiment is a cable position sensor, it could alternatively be any of a variety of other types of sensors, including but not limited to mechanical, optical electrical, magnetic, radio frequency, and infrared sensors or switches.

A container tracking system includes a ground signpost 81 that is fixedly supported in approximately the center of the lower beam 29, on the inner side of the beam 29. The signpost 81 is a device of a type known in the art, and is therefore described only briefly here. The signpost 81 contains a not-illustrated antenna, and a not-illustrated transmitter circuit that uses the antenna to transmit a low-frequency signpost signal. The signpost signal is generated by amplitude modulating a carrier signal that, in the disclosed embodiment, has a carrier frequency of approximately 123 KHz. The antenna in the signpost is configured so that, in association with this carrier frequency, the low-frequency signpost signals exhibit near field characteristics of a primarily magnetic character.

More specifically, electromagnetic signals can include both an electrical characteristic (the E field) and a magnetic characteristic (the H field). As noted above, the antenna in the signpost 81 is configured so that, at the specified carrier frequency, it generates signpost signals consisting primarily of the magnetic H field, with only a nominal E field. Moreover, this is a non-propagating signal, representing stored energy in the region around the signpost. Consequently, the signpost signals are relatively strong in the near field, but almost negligible in the far field. The localized nature of these signpost signals helps to facilitate compliance with governmental regulations regarding wireless transmissions, and also helps to minimize reception of these signals other than in the localized region around the signpost that transmits them.

As mentioned earlier, the crane 11 has an approximately rectangular frame that is made of steel, and that is bounded on four sides by the vertical posts 16-19. Since the wireless signpost signals transmitted by the signpost 81 are primarily magnetic in character, they can be affected by environmental factors. As one example, in the disclosed embodiment the frame of the crane is made of metal and is therefore electrically conductive. The electrically conductive metal frame tends to enhance these signals within the interior of the frame, while attenuating them in regions external to the frame. In FIGS. 1 and 2, reference numeral 82 designates a broken line that represents the transmission range or field of the signpost signals transmitted by the ground signpost 81. The signpost signals transmitted by the signpost 81 include a digital code that is unique to the signpost 81, so that a device receiving the signposts signals can tell they originated from the signpost 81, rather than from some other signpost.

A cabin signpost 86 is fixedly mounted to the underside of the cabin 61 of the crane. In the disclosed embodiment, the cabin signpost 86 is effectively identical to the ground signpost 81, except that signpost signals transmitted by the cabin signpost 86 contain a unique digital code that is different from the unique digital code in the signpost signals transmitted by the ground signpost 81. When the cabin 61 is disposed within the metal frame of the crane 11, the magnetic signpost signals transmitted by the cabin signpost 86 are enhanced somewhat by the electrically conductive characteristics of the metal frame.

Reference numeral 87 designates a broken line that represents the transmission range or field of the signpost signals transmitted by the cabin signpost 86, when the cabin 61 is within the metal frame. In contrast, when the cabin 61 moves along the support beams 41 and 42 to a position in which it is outside the metal frame, as shown diagrammatically by broken lines in FIG. 1, the signpost signals from the cabin signpost 86 receive a reduced degree of enhancement from the metal frame. Reference numeral 87A designates a broken line that represents the reduced transmission range or field of the signpost signals from the cabin signpost 86, when the cabin 61 is outside the metal frame. The transmission power of the cabin signpost 86 may intentionally be set to a limited power level that ensures the wireless signals emitted by the cabin signpost do not trigger and wake up tags on containers within the cargo hold of a ship that is being loaded or unloaded. Under certain circumstances, especially when the cabin 61 is disposed within the metal frame of the crane, the fields 82 and 87 of the signposts 81 and 86 can overlap, as indicated diagrammatically at 88.

As a practical matter, the signpost signals transmitted by the signposts 81 and 86 can be affected not only by the metal frame of the crane, but to a lesser extent by a variety of other environmental factors, such as the metal material of a container 12 that is being moved by the crane. These other types of effects are not all discussed here in detail, but it should be recognized that they can be present.

In addition to the signposts 81 and 86, the container tracking system includes a radio frequency identification (RFID) tag 91, which is fixedly mounted on the container 12. Each container moved by the crane may have a similar tag mounted thereon. The tag 91 is a device of a type known in the art, except for some unique aspects that are discussed later. The tag 91 contains a not-illustrated antenna, and associated receiver circuitry that can receive the signpost signals transmitted by the signposts 81 and 86. The tag 91 also contains a further antenna that is not illustrated, and associated ultra high frequency (UHF) transmitter circuitry. The tag 91 can use its UHF transmitter to transmit tag signals. The tag 91 generates the tag signals by effecting frequency shift keying (FSK) modulation of certain information onto a carrier signal that, in the disclosed embodiment, has a carrier frequency of 433.92 MHz. Other suitable carrier frequencies could alternatively be used. The tag signals are propagating signals that have both an E field and an H field, and the transmission range for the tag signals is substantially longer than that for the signpost signals. The tag signals include a digital code that uniquely identifies the tag 91 that transmitted the tag signals. In addition, when the tag 91 has received one or more signpost signals, the tag signals transmitted by the tag can include the unique digital signpost identification code from the received signpost signals.

The container tracking system further includes a reader 94, which is fixedly mounted on the inner side of the middle beam 32. The reader 94 is a device of a known type, and can receive the UHF tag signals transmitted by the tag 91, or by other similar tags. The container tracking system further includes a central system that is not separately illustrated, and that is operatively coupled to the signposts 81 and 86, the reader 94, and the sensor 68, for example through not-illustrated cables. The reader 94 and the central system could share a common housing.

With reference to FIGS. 1 and 2, assume that the container 12 is currently supported by the crane 11 at the position shown in FIG. 1. The container 12 with the tag 91 thereon are within the transmission range or field 87 of signpost signals transmitted by the signpost 86. The tag 91 will thus be receiving these signposts signals. The tag 91 will be transmitting tag signals that include the unique digital tag code of the tag 91, as well as the unique digital signpost code from the received signpost signals. In this regard, for the sake of simplicity here, it is assumed that the tag 91 transmits tag signals relatively frequently, at least when it is receiving signpost signals. Alternatively, however, the tag could transmit tag signals less frequently, on more of an "as needed" basis. The tag signals transmitted by the tag 91 will be received by the reader 94, and will be forwarded to the not-illustrated central system, for example through a not-illustrated cable. Based on information from the tag signals, the central system will know that the tag 91 and thus the associated container 12 are somewhere in the vicinity of the cabin 61 with the cabin signpost 86 thereon.

Still referring to FIG. 1, assume that the crane 11 lowers the container 12 vertically downwardly from the elevated position shown in FIG. 1, to a not-illustrated position in which the container is resting on the ground. The container 12 and the tag 91 will then be outside the transmission range or field 87 of the cabin signpost 86, and within the transmission range or field 82 of the ground signpost 81. The tag 91 will thus be receiving the signpost signals transmitted by the ground signpost 81. Further, the tag will be transmitting tag signals that include the unique digital tag code of the tag 91, as well as the unique digital signpost code of the signpost 81. The reader 94 will be receiving these tag signals, and will be forwarding the information from them to the not-illustrated central system. The central system will thus know that the container 12 is somewhere close to the ground, in the general vicinity of the signpost 81.

As the crane lowers the container 12 from the elevated position shown in FIG. 1 to the not-illustrated position where the container is resting on the ground, the container 12 will move from a position where the tag 91 is transmitting tag signals that include the digital signpost code of the signpost 86 to a position where the tag 91 is transmitting tag signals that include the digital signpost code of the signpost 81. The not-illustrated central system can tell from this information that the container 12 has been moved downwardly by the crane, or in other words that the container 12 is being unloaded from something. Conversely, when the crane 11 lifts the container 12 from a position near the ground to the elevated position shown in FIG. 1, the tag 91 will move from a position where it is transmitting tag signals that include the unique digital signpost code of the signpost 81 to a position where it is transmitting tag signals that include the unique digital signpost code of the signpost 86. The central system will thus know that the container 122 has been moved upwardly by the crane 11, or in other words that the container 12 is being loaded onto or into something.

As discussed earlier, it is possible for the transmission range or field 82 of the signpost signals from signpost 81 to overlap at 88 with the transmission range or field 87 of the signpost signals from signpost 86. As the tag 91 moves vertically through this overlap region 88, problems could potentially occur. First, if the signposts 81 and 86 are both transmitting signposts signals at exactly the same time, these signpost signals could possibly "collide" with each other in the overlap region 88, as a result of which the tag 91 might not be able to make sense of either signpost signal. Accordingly, in the disclosed embodiment, the not-illustrated central system is coupled to and synchronizes operation of the signposts 81 and 86, so that they transmit in an alternating manner. Consequently, signals from the two signposts will not collide with each other.

A further potential problem is that, even when the signposts 81 and 86 are synchronized in this manner, when the tag 91 moves vertically through the overlap region 88, the tag may receive signals from each of the signpost 81 and 86 in an alternating manner. This could potentially cause the tag 91 to repeatedly "flip-flop" between (1) transmitting tag signals that contain the unique signpost code of the signpost 81, and (2) transmitting tag signals that contain the unique signpost code of the cabin signpost 86. In order to avoid this potential flip-flopping problem, the tag 91 uses a novel technique that allows it to effect a single transition from recognizing one of the signposts to recognizing the other thereof.

Figure 3:
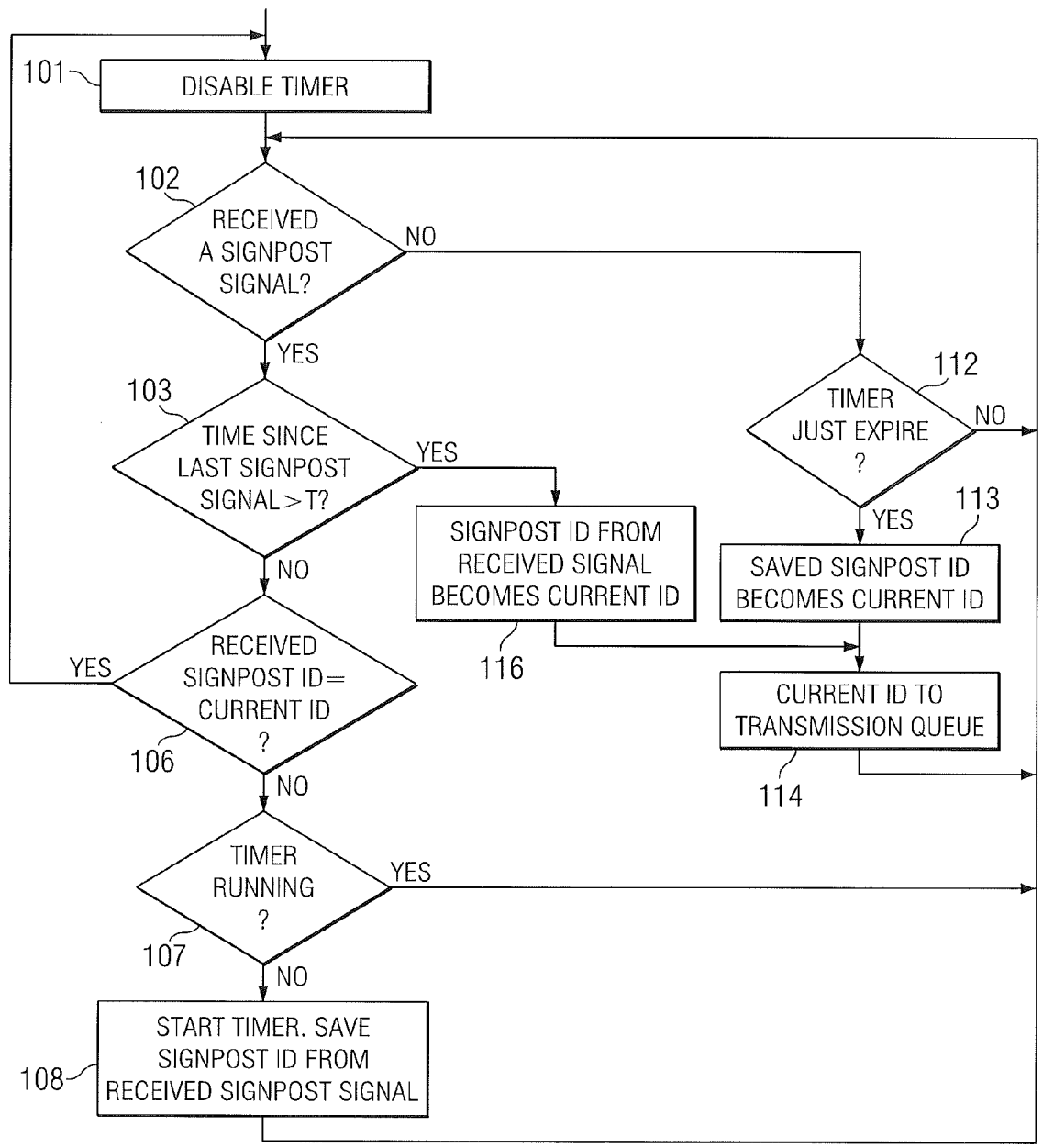
FIG. 3 is a flowchart depicting a technique carried out by a radio frequency identification tag that is a component of the apparatus of FIG. 1.

In more detail, FIG. 3 is a flowchart depicting how the tag 91 carries out this technique. Beginning in block 101, the tag 91 disables an internal timer. Control then proceeds to block 102, where the tag checks to see whether it has received a signpost signal. Assuming that it has, control proceeds to block 103, where the tag checks to see whether a predetermined amount of time "T" has elapsed since the tag last received a signpost signal. In the scenario under consideration, where the tag 91 is moving from one of the overlap regions 82 and 87 to the other thereof through the overlap region 88, the tag will be receiving signpost signals almost continuously. Control will therefore proceed from block 103 to block 106.

In block 106, the tag 91 checks to see whether the unique signpost identification code in the received signpost signal is the same as a current signpost identification code. If the tag is moving out of the field 82, then the current identification code will be the identification code of the ground signpost 81. Conversely, if the tag is moving out of the field 87, then the current identification code will be the identification code of the cabin signpost 86. The current identification code is the signpost identification code that the tag includes in the tag signals that it transmits. If the tag determines in block 106 that the newly-received signpost identification code is different from the current signpost identification code, then the tag has entered and is traveling through the overlap region 88, and control proceeds to block 107.

In block 107, the tag checks to see whether the timer is running. In the hypothetical scenario under discussion, the timer will not yet be running, and so control will proceed to block 108. In block 108, the tag starts the timer, and saves the unique signpost identification code from the signpost signal that it just received. The tag does not yet replace the current signpost identification code with this new signpost identification code. Control then returns to block 102.

In block 102, the tag checks to see whether it has received yet another signpost signal. Assume that the tag finds it has just received another signpost signal, and proceeds to block 102 through block 103 to block 106. If the signpost identification code in this latest signpost signal is the same as the current signpost identification code, control will proceed from block 106 to block 101, where the tag will turn off the timer. By turning off the timer, the tag will effectively ignore the new signpost code that was previously received and stored at block 108. Thus, as the tag is moving through the overlap region 88, and is alternately receiving signpost signals from each of the signposts 81 and 86, the tag will effectively ignore all signpost signals that contain signpost identification codes different from its current signpost identification code, until after the tag has passed through the overlap region 88.

In particular, when the tag exits the overlap region 88, it will stop receiving signpost signals containing signpost identification codes that are identical to the tag's current identification code, and will thereafter receive only signpost signals containing the new signpost identification code. Consequently, in block 106, the tag will not return to block 101 and disable the timer 101. Instead, the tag will proceed each time to block 107. In block 107, the tag will find that the timer is already running, and then control will return directly to block 102 to await the receipt of a further signpost signal.

In block 102, if the tag finds that it has not received a signpost signal, the tag proceeds to block 112, where it checks to see whether the timer has just expired. If not, then the tag returns to block 102 in order to continue to wait for another signpost signal. Otherwise, if the timer has just expired, then the tag has exited the overlap region 88, and has received only signals from the new signpost for the time period measured by the timer 88. This means that it is time for the tag to transition from recognizing the old signpost to recognizing the new signpost. Therefore, control proceeds from block 112 to block 113, where the tag takes the new signpost identification code that it saved most recently at block 108, and assigns this new signpost identification code to be the current identification code.

As noted earlier, the current signpost identification code is the signpost identification code that the tag includes in its tag signals. From block 113, control proceeds to block 114, where the tag moves the current signpost identification code into the tag's transmission queue. When the tag completes any sequence of transmissions that may already be in progress and that use the prior value of the current identification code, the tag will find the new value of the current identification code in the transmission queue, and will then switch over to using the new value of the current identification code in the tag signals that it transmits. From block 114, control returns to block 102.

In block 103, and as discussed above, the tag checks to see whether a predetermined time "T" has elapsed since the tag last received a signpost signal. This will be the case, for example, where a container was stored at a ground level location outside the transmission field 82 of the ground signpost 81, but has just been moved into the field 82. Upon entering the field 82, the tag will immediately receive a signpost signal transmitted by the signpost 81, and will thus proceed from block 103 to block 116, where it immediately assigns the signpost identification code from the received signpost signal to be the current identification code. Control then proceeds to block 114, where this new current identification code is moved into the transmission queue.

From the foregoing discussion, it should be evident that, as the container 12 is moved upwardly from the field 82 of ground signpost 81 through the overlap region 88 to the field 87 of cabin signpost 86, the tag will wait until after it has exited the overlap region 88, and then will make a single transition from recognizing the ground signpost 81 to recognizing the cabin signpost 86. Similarly, when the container 12 is moved downwardly through the overlap region 88, the tag 91 will make a single transition from recognizing the cabin signpost 86 to recognizing the ground signpost 81. Thus, in a sense, the technique shown in FIG. 3 introduces a degree of hysteresis into the tag's recognition of signposts, so that the tag does not repeatedly flip-flop between recognizing the signpost 81 and recognizing the signpost 86 while the tag is within the overlap region 88.

Figure 4:
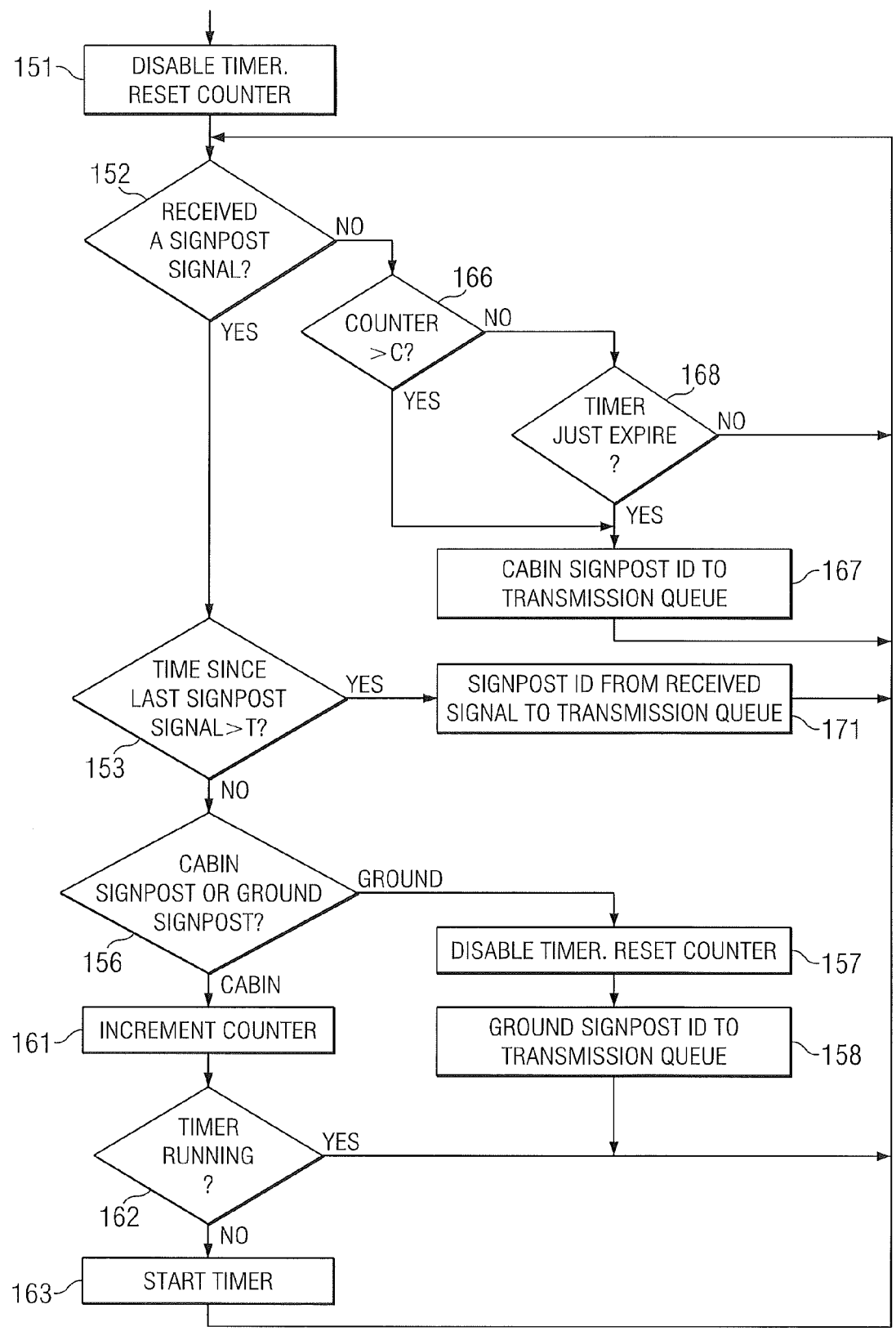
FIG. 4 is a flowchart depicting a technique that is an alternative embodiment of the technique shown in FIG. 3.

FIG. 4 is a flowchart depicting a technique that is an alternative embodiment of the technique shown in FIG. 3. In this technique, the ground signpost 81 is given priority over the cabin signpost 86. In more detail, and beginning in block 151, the tag disables the timer, and also resets a counter. Control then proceeds to block 152, where the tag checks to see whether it has just received a signpost signal. If so, then control proceeds to block 153, where the tag checks to see whether a predetermined time "T" has elapsed since the tag last received any signpost signal. In the scenario under discussion, the tag will be receiving signpost signals almost continuously, and so control will progress from block 153 to block 156, where the tag will determine whether the signpost code in the most recently received signpost signal is from the ground signpost 81 or the cabin signpost 86. If the received signpost signal is from the ground signpost 81, then the tag immediately proceeds to block 157, where it disables the timer and resets the counter. Then, in block 158, the tag moves the signpost code from the received signpost signal into the transmission queue, so that tag signals transmitted by the tag will include the unique signpost code of the ground signpost 81. Control then returns to block 152.

Referring again to block 156, if the tag determines that the most recently received signpost signal is from the cabin signpost 86, then the tag proceeds to block 161, where the tag increments the counter. Then, in block 162, the tag checks to see whether the timer is already running. If so, then the tag returns to block 152. Otherwise, in block 163, the tag starts the timer, and then returns to block 152.

In block 152, if the tag finds that it has just received another signpost signal, it proceeds to block 166, where it checks to see whether the count in the counter is greater than a predetermined count "C". In effect, if the tag receives "C" successive signpost signals from the cabin signpost 86, then control will proceed to block 167, where the unique signpost identification code of the cabin signpost is placed in the transmission queue, so that this code will be used in tag signals transmitted by the tag. Control then proceeds to block 167 back to block 152.

In block 166, if the tag determines that the count in the counter is below the predetermined count "C", then control proceeds from block 166 to block 168, where the tag checks to see whether the timer has just expired. If not, then control returns to block 152. Otherwise, if the timer has just expired, then the tag has not received any signpost signal from the ground signpost 81 during the time interval measured by the timer, and the tag therefore proceeds to block 167 in order to transition over to use of the signpost identification code for the cabin signpost.

In a situation where the tag has not been within the transmission field of any signpost for the time period "T", and then enters a signpost field, the tag will soon find itself in block 153, and will then proceed to block 171. In block 171, the tag immediately takes the unique signpost identification code from the received signal, and places this code in the transmission queue, so that this code will immediately be included in tag signals transmitted by the tag, regardless of whether the received signpost signal was from the ground signpost or the cabin signpost.

Summarizing the technique shown in FIG. 4, the ground signpost 81 receives priority over the cabin signpost 86. If the tag receives a signpost signal from the ground signpost 81, then that signal takes precedence, and the tag will promptly include the unique signpost identification code of the ground signpost in its tag signals. On the other hand, whenever the tag receives a signpost signal from the cabin signpost 86, the tag will not transition over to use of the identification code for the cabin signpost unless one of several conditions is met. First, if the signpost signal from the cabin signpost is received at the end of a predetermined time interval "T", during which no signpost signals were received from any signpost, then the tag will immediately begin transmitting tag signals that contain the signpost code of the cabin signpost. Second, if the tag receives a signpost signal from the cabin signpost and then does not receive any signpost signal from the ground signpost during the time interval measured by the timer, then the tag will transition over to putting the signpost identification code of the cabin signpost into its tag signals. Third, if the tag receives "C" successive signpost signals from the cabin signpost without receiving any signpost signal from the ground signpost, then the tag will transition over to putting the signpost identification code of the cabin signpost into its tag signals.

Figure 5:
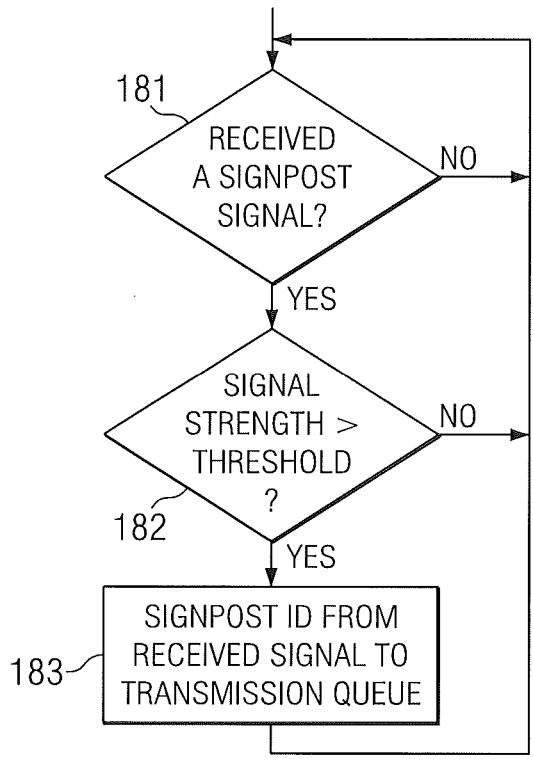
FIG. 5 is a flowchart showing a technique that is a further alternative embodiment of the technique shown in FIG. 3.

FIG. 5 is a flowchart depicting a technique that is a further alternative embodiment of the technique shown in FIG. 3. In block 181 of FIG. 5, the tag checks to see whether it has received a signpost signal. If not, then it waits for signpost signals in a loop that includes block 181. On the other hand, when a signpost signal is received, control proceeds from block 181 to block 182. One of the capabilities of the tag 91 is that it can determine the strength or amplitude of each signpost signal it receives. In block 182, the tag checks to see whether the signal strength of the received signpost signal is greater than a predetermined threshold. In general, the thresholds are established so that, when the tag is in the overlap region 88, the signpost signals from the ground signpost 81 will be below one threshold, and the signpost signals from the cabin signpost 86 will be below a different threshold. Consequently, if the tag is in the overlap region 88, control will return from block 182 back to block 181. On the other hand, if the received signpost signal is above its corresponding threshold, then the tag knows it is not within the overlap region 88, and the tag proceeds to block 183. In block 183, the tag moves the unique signpost identification code from the received signpost signal into the transmission queue, so that this unique code will be promptly included in tag signals transmitted by the tag. From block 183, control returns to block 181.

Figure 6:
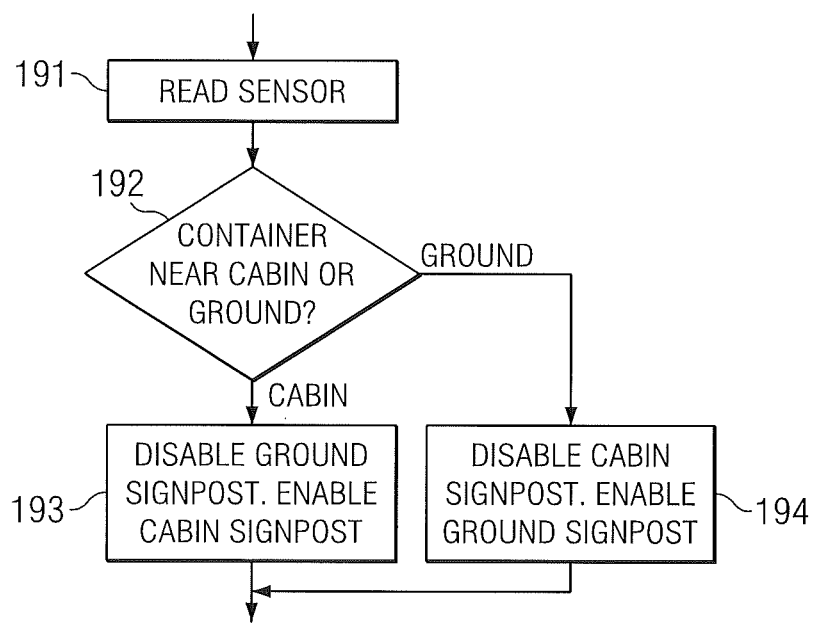
FIG. 6 is a flowchart depicting a technique that is still another alternative embodiment of the technique shown in FIG. 3, and that is carried out by a not-illustrated central system that cooperates with the apparatus of FIG. 1.

FIG. 6 is a flowchart depicting a technique that is still another alternative embodiment of the technique shown in FIG. 3. The technique of FIG. 6 is implemented using the not-illustrated central system that is coupled to the reader 94, the signposts 81 and 86, and the sensor 68. In block 191, the central system reads information from the sensor 68 that represents the current vertical position of the container 12. In block 192, the central system uses this information from sensor 68 to determine whether the container 12 is currently closer to the cabin signpost 86 or the ground signpost 81. If the container is closer to the cabin signpost 86, then control proceeds to block 193. In block 193, the central system disables the ground signpost 81 so that the ground signpost 81 does not transmit any signpost signals, and enables the cabin signpost 86 so that it transmits signpost signals. Conversely, if it is determined in block 192 that the container 12 is closer to the ground signpost 81, then control proceeds to block 194, where the central system disables the cabin signpost 86 so that it does not transmit any signpost signals, and enables the ground signpost 81 to transmit signpost signals. Thus, through use of the technique shown in FIG. 6, only one of the two signposts 81 and 86 is enabled at any given point in time. Consequently, while the fields 82 and 87 of the two signposts 81 and 86 may overlap 88 in physical space, they will not overlap in time, because they will not both be transmitting at the same time in the overlap region 88. In particular, any given point in time, one or the other of the two signposts 81 and 86 will be disabled.

Figure 7:
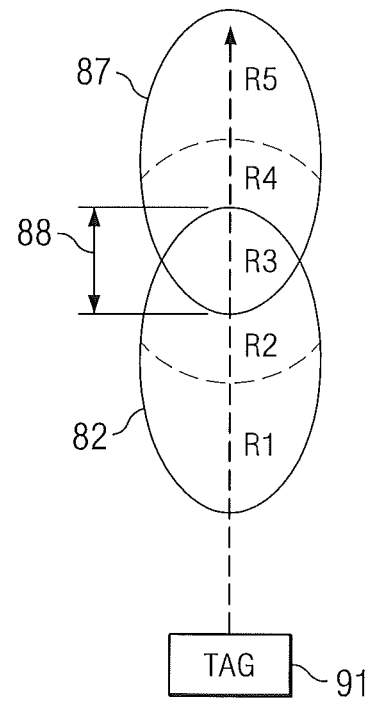
FIG. 7 is a diagram showing the tag of FIG. 1 moving through overlapping transmission fields of two signposts.

FIG. 7 is a diagram showing the transmission field 82 of the ground signpost 81, and the transmission 87 of the cabin signpost 86, as well as the overlap 88 therebetween. As the tag 91 moves upwardly through the transmission fields 81 and 82, it passes successively through five regions R1, R2, R3, R4 and R5. In region R1, the tag 91 receives signals from the ground signpost 81, but not the cabin signpost 86. In region R2, the tag is approaching the transmission field 87 of the cabin signpost 86. Although reference numeral 87 designates the theoretical transmission range of the signals from cabin signpost 86, as a practical matter these signals do not end precisely at any boundary line. Consequently, in the region R2, the tag 91 may begin to receive signals from the cabin signpost 86, although these signals are likely to be relatively weak and possibly incomplete. For example, in the disclosed embodiment, signpost signals emitted by the signposts 81 and 86 each include a preamble that is followed by data and then error-checking information, such as a cyclic redundancy code (CRC). Tag 91 may receive all or part of the preamble, and thus recognize at a signpost signal is present, but the data and/or the CRC code may not be received, or may include errors.

In due course, the tag will enter region R3, or in other words the overlap region 88. In region R3, the tag should easily receive signals from both the ground signpost 81 and the cabin signpost 86. Later, the tag will move into region R4. In theory, the tag should not be receiving signals from the ground signpost in region R4. However, with reference to the foregoing discussion of region R2, the tag may pick up relatively weak signals from the ground signpost in region R4, where the received information may be erroneous and/or incomplete. As one example, the tag may receive the preamble of a signal, but not the information that follows the preamble. The tag will eventually move from region R4 into region R5, where it will receive signals from the cabin signpost 86, but will not receive signals from, the ground signpost 81.

Figure 8:
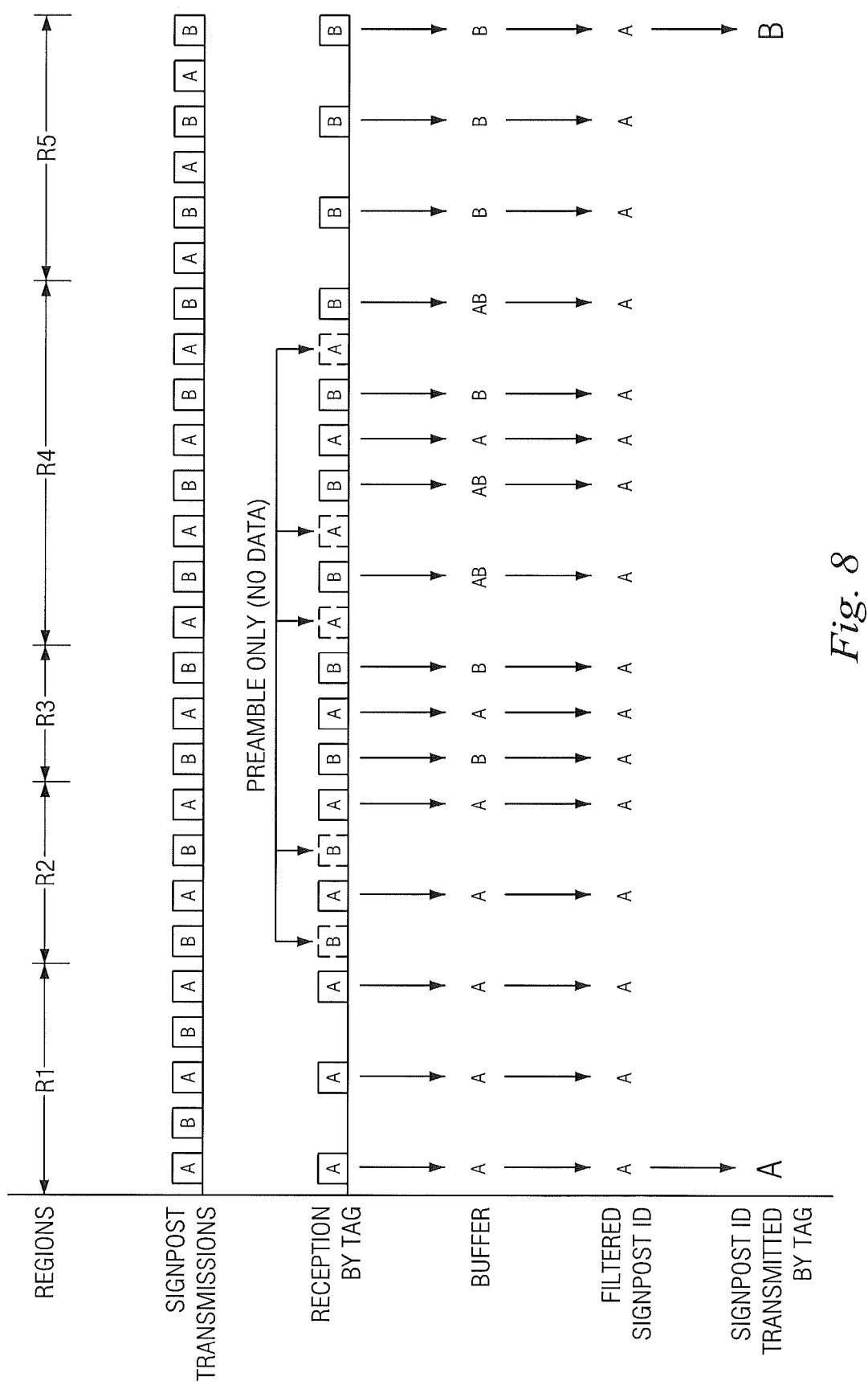
FIG. 8 is a timing diagram showing aspects of a technique that is a further alternative embodiment of the technique shown in FIG. 3.

FIG. 8 is a timing diagram showing aspects of a technique that is a further alternative embodiment of the technique shown in FIG. 3. Reading from left to right in FIG. 8 corresponds to upward movement of the tag 91 in FIG. 7. The top line in FIG. 8 identifies the time periods that the tag successively spends in each of the regions R1, R2, R3, R4 and R5, as the tag moves upwardly in FIG. 7. The next line in FIG. 8 is a diagrammatic representation of the transmissions of signpost signals by the ground signpost 81 and the cabin signpost 86, where the ground signpost 81 is represented by the letter A, and the cabin signpost is represented by the letter B. As explained earlier, these two signposts are synchronized, so that they transmit their signpost signals in an alternating manner.

The next line in FIG. 8 depicts the signpost signals that are received by the tag 91. As discussed above, when the tag is in region R1 it receives only the signpost signals A from the ground signpost. In region R2, the tag receives the signals A from the ground signpost, and possibly some incomplete or erroneous signals B from the cabin signpost. Then, in region R3, the tag reliably receives signpost signals A and B from both the ground signpost and the cabin signpost. Then, in region R4, the tag receives signpost signals B from the cabin signpost, and may possibly receive signals A from the ground signpost, where the signals A may possibly be incomplete or erroneous. Finally, in region R5, the tag receives only the signpost signals B from the cabin signpost.

Figure 9A:
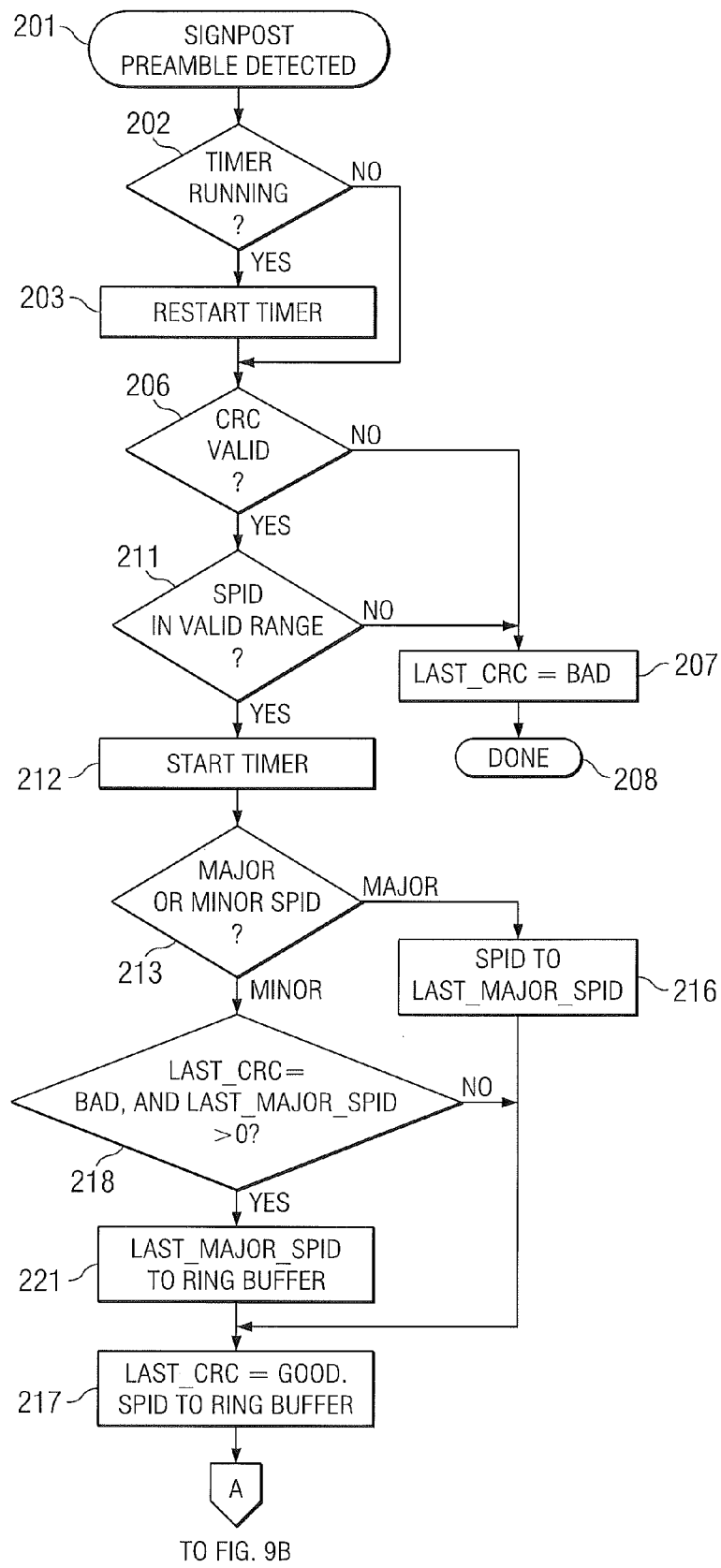
FIGS. 9 and 10 are flowcharts showing an implementation of the technique of FIG. 8.
Figure 9B:
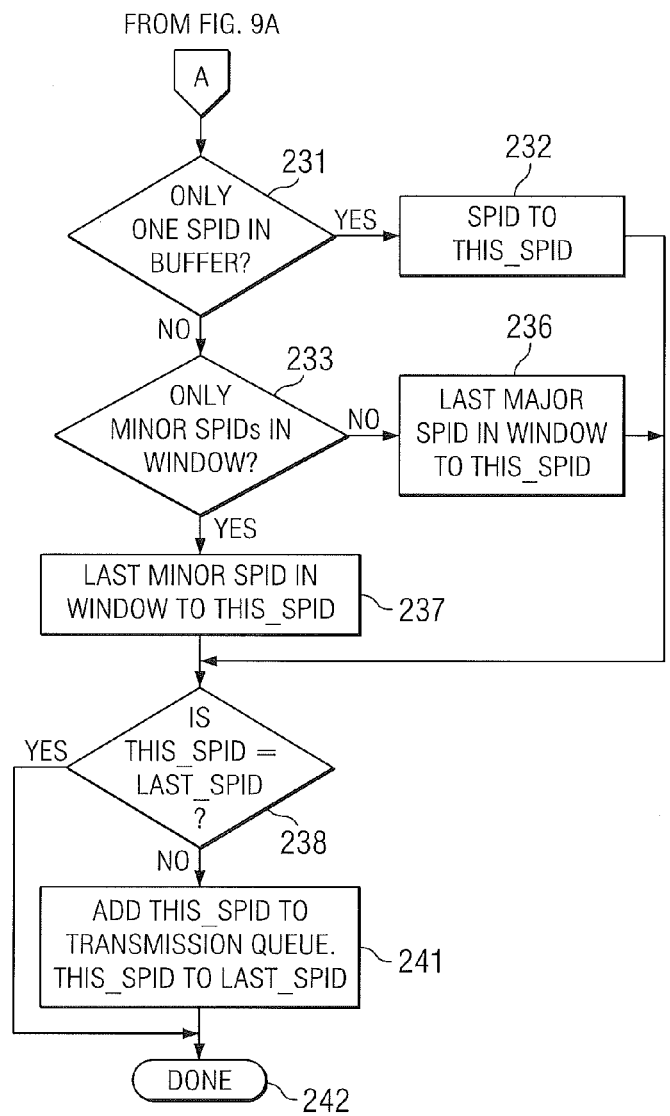
Figure 10:
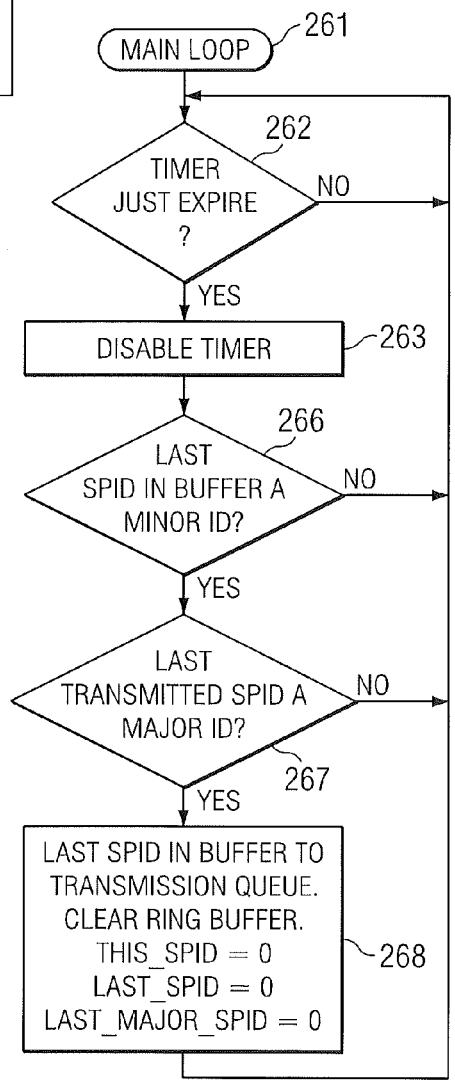

FIGS. 9 and 10 are flowcharts depicting an implementation of the technique of FIG. 8. In FIGS. 9 and 10, the ground signpost 81 is treated as the primary or major signpost, and the cabin signpost 86 is treated as the minor or secondary signpost. The major signpost (ground signpost) takes a precedence over the minor signpost (cabin signpost). Whenever the tag determines that it is receiving the preamble of a wireless signpost signal, the tag enters the flowchart of FIG. 9A at block 201. Entry to block 201 may be an interrupt-driven event.

Control progresses from block 201 to block 202, where the tag checks to see whether a timer is running. The tag uses the timer to help determine when the tag should transition from recognizing one signpost to recognizing the other. If the tag determines that the timer is running, then the tag proceeds to block 203, where it restarts the timer. In either case, control ultimately proceeds to block 206, where the tag uses the CRC code in the received signpost signal to determine whether the received signpost signal is complete and accurate. If not, then the tag proceeds to block 207, where it sets a variable LAST_CRC to indicate that the CRC check identified a problem. Control then proceeds to block 208, where the tag exits the routine of FIG. 9.

If it is determined in block 206 that the CRC code did not identify any errors, then control proceeds to block 211, where the tag checks the unique signpost identification (SPID) code in the received signal, in order to see if it is within a valid range. In this regard, the SPID code in signals received from the ground signpost should be within one range, and the SPID code in signals received from the cabin signpost should be in a different range. If the received signal contains an SPID code that is not within either of these ranges, then control proceeds to block 207. Otherwise, control proceeds to block 212, where the tag starts the timer.

Control then proceeds to block 213, where the tag checks the SPID code from the received signpost signal in order to determine whether the signal was transmitted by the major signpost (ground signpost 81) or the minor signpost (cabin signpost 86). If the received signal is from the major signpost, then control proceeds to block 216, where the tag takes the SPID code from the received signpost signal, and saves this code in a variable called LAST_MAJOR_SPID. Control then proceeds to block 217, where the tag sets the variable LAST_CRC to indicate that the tag performed a CRC check on the received signal in block 206, and did not identify any problems in the received signal. In addition, the tag takes the SPID code from the received signal and places it in a ring buffer. The ring buffer is an endless buffer having 20 locations or entries. Once the buffer becomes full, each subsequent new entry replaces the oldest existing entry in the buffer. The fourth line in FIG. 8 shows a series of SPID codes that are successively inserted into the ring buffer.

If the tag determines in block 213 that the received signal is from the minor signpost (cabin signpost), then control proceeds to block 218, where the tag checks to see (1) whether the variable LAST_CRC is indicating the last CRC check failed and (2) whether the variable LAST_MAJOR_SPID has a value greater than zero. If either of these conditions is not met, then control proceeds directly to block 217. Otherwise, if both conditions are met, then control proceeds to block 221, where the tag takes the SPID code from the variable LAST_MAJOR_SPID, and places this SPID code in the ring buffer. The fourth line in FIG. 8 shows the SPID codes that, in the example of FIG. 8, are successively inserted into the buffer.

From block 217, control proceeds to block 231, where the tag checks to see whether the ring buffer has only a single entry. If so, then control proceeds to block 232, where the tag takes the SPID code from the received signpost signal, and saves this code in a variable called THIS_SPID. In FIG. 8, the fifth line shows the sequence of SPID codes that, in the example of FIG. 8, are successively stored in the variable THIS_SPID.

If it is determined in block 231 that the buffer currently contains more than one SPID code, then control proceeds to block 233, where the tag checks to see whether any SPID codes from the minor signpost (cabin signpost) are present in a window in the buffer, where the window is the most recent "n" entries added to the buffer. In the disclosed embodiment, n=4. In other words, the size of the window is four entries. If the window contains something other than just SPID codes for the minor signpost, then control proceeds to block 236. In block 236, the tag takes the most recent SPID code that is within the window and that is from the major signpost, and stores this SPID code in the variable THIS_SPID. On the other hand, if it is determined in block 233 that the window contains only SPID codes from the minor signpost, then control proceeds to block 237. In block 237, the tag takes from the window the most recent SPID code from the minor signpost, and saves this in the variable THIS_SPID. From any of blocks 232, 236 and 237, control proceeds to block 238.

In block 238, the tag checks to see whether the value in the variable THIS_SPID is the same as the value in the variable LAST_SPID, where the variable LAST_SPID contains the most recent prior value from the variable THIS_SPID. If the values in these two variables are the same, then block 241 is skipped. Otherwise, control proceeds to block 241, where the tag adds the SPID code from the variable THIS_SPID to the transmission queue, so that this SPID code will be transmitted in a wireless tag signal. Next, the tag takes the SPID code from the variable THIS_SPID, and saves it in the variable LAST_SPID. Control then proceeds to block 242, where the tag exits the routine of FIG. 9.

The flowchart of FIG. 10 represents a portion of a main loop executed by a processor within the tag 91. Beginning in block 261, control eventually proceeds to block 262, where the tag checks to see whether the timer has just expired. If not, then control returns to block 262, where the tag waits for the timer expire, or for the receipt of a wireless signpost signal that initiates entry to the routine of FIG. 9 at block 201. If it is eventually determined at block 262 that the timer has just expired, then control proceeds to block 263, where the tag disables the timer.

From block 263, control proceeds to block 266, where the tag checks to see whether the SPID code that was most recently inserted into the buffer was for the minor signpost (cabin signpost). If not, then control returns to block 262. Otherwise, control proceeds to block 267, where the tag checks to see whether the SPID code transmitted most recently in a tag signal is for the major signpost (ground signpost). If not, then control returns to block 262. Otherwise, control proceeds to block 268, where the tag takes the SPID code most recently inserted into the buffer, and adds this SPID code to the transmission queue. Then, the tag clears the ring buffer, and sets each of THIS_SPID, LAST_SPID and LAST_MAJOR_SPID to 0. Control then returns from block 268 to block 262.

Although selected embodiments have been illustrated and described in detail, it should be understood that a variety of substitutions and alterations are possible without departing from the spirit and scope of the present invention, as defined by the claims that follow.

What is claimed is:

1. An apparatus comprising:
a first transmission device producing a first wireless signal defining a first transmission field;
a second transmission device producing a second wireless signal defining a second transmission field, the second transmission field partially overlapping the first transmission field in a region of overlap;
a tag that can receive the first and second wireless signals, wherein when said tag is moving from the first field to the region of overlap and into the second field, said apparatus transitions only once from recognizing that said tag is in the first field to recognizing that said tag is in the second field using a hysteresis technique to determine when to transition from recognizing that said tag is in the first field to recognizing that that said tag is in the second field.

2. An apparatus according to claim 1, wherein said tag carries out the determination of when to transition from recognizing that said tag is in the first field to recognizing that said tag is in the second field.

3. An apparatus according to claim 1, wherein said tag can transmit further wireless signals containing information that is a function of the first and second wireless signals, the apparatus further comprising:
a system having a reader that can receive said further wireless signals, and having structure for sensing positional information regarding said tag, said system carrying out the determination of when to transition from recognizing that said tag is in the first field to recognizing that said tag is in the second field, as a function of the positional information and the further wireless signals.

4. An apparatus according to claim 1, including wherein the first and second transmission devices respectively comprise first and second signposts, the apparatus further comprising:
a system having structure for sensing positional information regarding said tag, said system selectively enabling and disabling said first and second signposts as a function of the positional information.

5. An apparatus according to claim 4, wherein said first and second wireless signals transmitted by said signposts are near field signals of primarily magnetic character.

6. An apparatus according to claim 1, wherein when said tag first receives the second wireless signal, wherein the hysteresis technique includes delaying for a time interval before making a determination of whether said tag has moved from the first field to the second field.

7. An apparatus according to claim 1, wherein said apparatus determines which of the first and second fields said tag is currently in as a function of the relative received strengths of the first and second wireless signals.

8. An apparatus according to claim 1, wherein said apparatus assigns a high priority to one of the first and second wireless signals and a low priority to the other thereof, said apparatus recognizing one of the low priority wireless signals if none of the high priority wireless signals are subsequently received during a selected time interval.

9. An apparatus according to claim 1, wherein said apparatus assigns a high priority to one of the first and second wireless signals and a low priority to the other thereof, said apparatus recognizing one of the low priority wireless signals if a selected number of the low priority wireless signals are consecutively received without intervening receipt of any of the high priority signals.

10. The apparatus according to claim 1, wherein the apparatus comprises a crane and the first and second transmission devices are supported on said crane at spaced locations.

11. A method of operating an apparatus having a tag that can receive first and second wireless signals respectively defining first and second fields of transmission that overlap, comprising:
generating, by a first transmission device, the first wireless signal defining the first field of transmission;
generating, by a second transmission device, the second wireless signal defining the second field of transmission, the second field of transmission overlapping the first field of transmission in a region of overlap;
moving a tag between at least the first field of transmission and the second field of transmission;
detecting a location of the tag as it moves between at least the first field of transmission and the second field of transmission; and
transitioning only once from recognizing that said tag is in the first field to recognizing that said tag is in the second field when said tag is moving from the first field to the region of overlap and into the second field.

12. A method according to claim 11, including:
causing said tag to transmit further wireless signals containing information that is a function of the first and second wireless signals; and
causing a system separate from said tag to receive the further wireless signals and to sense positional information regarding said tag, and to carry out the determination of when to transition from recognizing that said tag is in the first field to recognizing that said tag is in the second field, as a function of the positional information and the further wireless signals.

13. A method according to claim 11, including causing a system separate from said tag to sense positional information regarding said tag, and to selectively enable and disable transmission of said first and second wireless signals as a function of the positional information.

14. A method according to claim 11, including responding to first receipt by said tag of one of the second wireless signals by delaying for a time interval before making a determination of whether said tag has moved from the first field to the second field.

15. A method according to claim 11, including determining which of the first and second fields said tag is currently in as a function of the relative received strengths of the first and second wireless signals.

16. A method according to claim 11, including:
assigning a high priority to one of the first and second wireless signals and a low priority to the other thereof; and
recognizing one of the low priority wireless signals if none of the high priority wireless signals are subsequently received during a selected time interval.

17. A method according to claim 11, including:
assigning a high priority to one of the first and second wireless signals and a low priority to the other thereof; and
recognizing one of the low priority wireless signals if a selected number of the low priority wireless signals are consecutively received without intervening receipt of any of the high priority signals.

18. An apparatus comprising:
a crane having a first portion and a second portion, the first portion being supported for movement relative to the second portion;

a first signpost supported on the first portion of the crane, the first signpost transmitting a first wireless signal defining a first field of transmission; and a second signpost supported on the second portion of the crane at a vertical separation from the first signpost, the second signpost transmitting a second wireless signal defining a second field of transmission, the second wireless signal being different from the first wireless signal, wherein the first field of transmission weakens when the first portion moves away from the second portion.

19. An apparatus according to claim 18, including structure cooperable with said first and second signposts for synchronizing operation thereof so that the first wireless signals are not transmitted simultaneously with the second wireless signals, and so that the second wireless signals are not transmitted simultaneously with the first wireless signals.

20. An apparatus according to claim 18, including structure responsive to movement of said first portion relative to said second portion and cooperable with said first signpost for weakening of the first field of transmission when said first portion moves to a selected operational position away from said second portion.

21. An apparatus according to claim 18, including a system having a reader that is supported in a region of said crane and that can receive further wireless signals different from the first and second wireless signals.

22. An apparatus according to claim 21, including a tag disposed on an object supported and moved by said crane, wherein said tag can receive the first and second wireless signals, and can transmit the further wireless signals.

23. An apparatus according to claim 22, wherein said system includes structure for sensing positional information regarding said tag, and for selectively disabling at least one of said first and second signposts as a function of said positional information.

24. An apparatus according to claim 18, wherein said first and second wireless signals transmitted by said signposts are near field signals of primarily magnetic character.

25. A method comprising:
transmitting a first wireless signal from a first signpost supported on a first portion of a crane, the first wireless signal defining a first field of transmission;
transmitting a second wireless signal from a second signpost supported on a second portion of the crane, vertically spaced from the first signpost, the second wireless signal being different from the first wireless signal and defining a second field of transmission; and
moving the first portion of the crane relative to the second portion of the crane, wherein
the first field of transmission weakens as the first portion is moved away from the second portion.

26. A method according to claim 25, including synchronizing transmission of said first and second wireless signals so that the first wireless signals are not transmitted simultaneously with the second wireless signals, and so that the second wireless signals are not transmitted simultaneously with the first wireless signals.

27. A method according to claim 25, including:
providing a tag on an object supported and moved by said crane;
causing said tag to receive the first and second wireless signals, and to transmit further wireless signals that are different from the first and second wireless signals;
sensing positional information regarding said tag; and
selectively disabling transmission of at least one of said first and second wireless signals as a function of said positional information.

28. An apparatus comprising:
a first signpost that transmits first wireless signals defining a first transmission field;
a second signpost, spaced apart from the first signpost, that transmits second wireless signals defining a second transmission field;
a tag that can move relative to the first signpost and the second signpost, and that can receive the first and second wireless signals transmitted by the first signpost and the second signpost when said tag is within the first transmission field or the second transmission field, respectively; and
a system having structure for sensing positional information regarding said tag, said system using said positional information to determine a location of said tag in relation to said first transmission field and the second transmission field, wherein
the system disables the first signpost when the location of the tag is determined to be out of the first transmission field and disables the second signpost when the location of the tag is determined to be out of the second transmission field.

29. An apparatus according to claim 28, further including a crane, said first signpost and the second signpost being supported in the region of said crane.

30. A method comprising:
transmitting, by a first signpost, a first wireless defining a first transmission field;
transmitting, by a second signpost, a second wireless signal defining a second transmission field;
sensing positional information regarding a tag that can move relative to the first transmission field and the second transmission field, and that can receive the first and second wireless signals when said tag is within the first transmission field or the second transmission field;
using said positional information to determine a location of said tag in relation to the first transmission field and the second transmission field; and
disabling the first signpost when the location of the tag is determined to be out of the first transmission field; and
disabling the second signpost when the location of the tag is determined to be out of the second transmission field.

31. A method according to claim 30, further comprising placing the first signpost and the second signpost in a region of a crane.

* * * * *